Jan. 10, 1933.   W. F. BERNSTEIN   1,894,015
SEPTIC INDICATOR
Filed Dec. 15, 1931
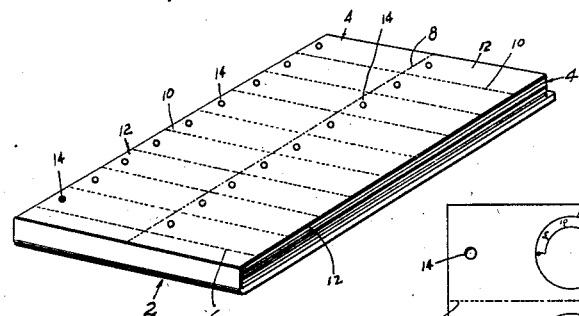
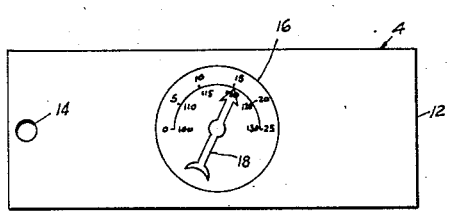
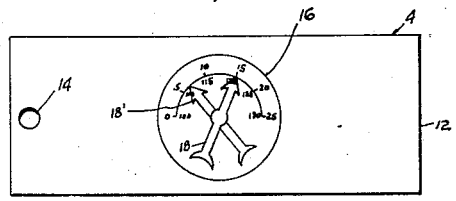
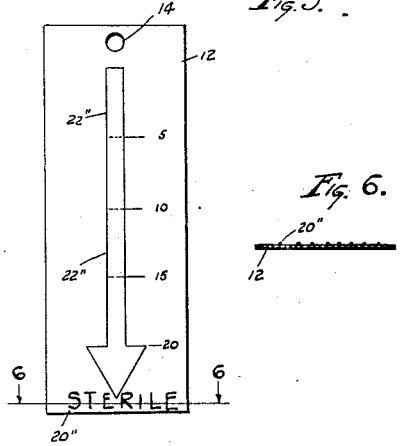
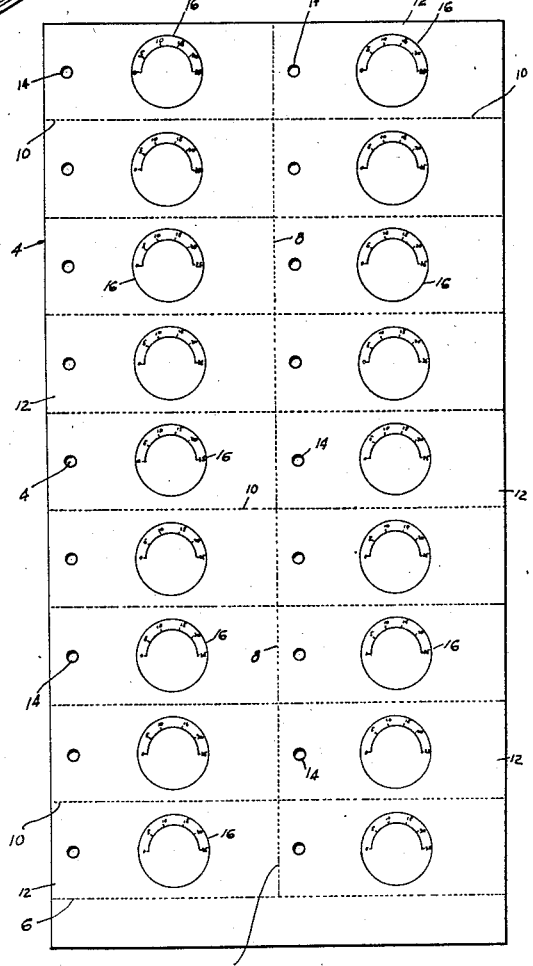
Inventor
W. F. BERNSTEIN
Attorney Patented Jan. 10, 1933

1,894,015

UNITED STATES PATENT OFFICE

WILBURN F. BERNSTEIN, OF LOS ANGELES, CALIFORNIA

SEPTIC INDICATOR

Application filed December 15, 1931. Serial No. 581,149.

My invention relates to septic indicators and the process therefor, as well as the composition of matter whereby said indicators may be rendered operative, such indicators being especially adapted for use in hospitals where sterilization is required, and where it is vital that the articles to be sterilized have been subjected to the required temperature and pressure conditions, said invention being exceedingly simple and inexpensive to construct, effective, efficient and certain in its operation, impossible to get out of order, and being capable of being manufactured with a marked saving in cost and effectiveness over known constructions heretofore proposed.

It accordingly is an object of my invention to provide a novel form of article of manufacture, process and composition of matter for effecting same, said invention comprising a suitable absorbent material, which may take a variety of forms as desired, and with which may be associated in any preferred way a combined temperature and pressure indicating means, or a temperature indicator alone, said indicating means being rendered effective by a heat sensitive material involving a novel composition of matter, which may be associated with said indicating means in any desired way.

A further object of my invention is to provide a novel composition of matter comprising an intimate mixture of a heat sensitive material or reagent, such as sulfur, a color changing material or reagent, such as one of the lead compounds, the latter being adapted to react with said heat sensitive material or reagent, to which may be added a suitable starchy material to hold the ingredients of the composition in uniform suspension, a suitable catalytic agent, such as glycerine being used, to render the composition sensitive to varying temperatures, and also, due to its oily nature to render said composition to the required fluency, any preferred form of sugar solution being also added to act as a catalytic, a suitable amount of distilled water being supplied to make the composition of the desired consistency.

If desired, also, turpentine may be added in suitable amounts as a drier, when needed, and moreover, a suitable amount of any preferred vegetable or mineral oil to provide for a favorable reaction with and application to the indicating means hereinbefore referred to and described.

A still further object of my invention is to produce an indicating means in the form of a book, provided with perforated leaves, each in turn perforated into cards, so that cards individually, or the leaves, may be easily removed from said book, which cards may also be provided with any desired means for conveniently suspending the same, such as holes adapted to receive lengths of wire. Said cards, if desired, may be provided with embossed letters, indicia, or symbols, treated with my novel composition of matter, so that when subjected to heat, as, for example, when positioned in an autoclave in a hospital, both sterilizing temperature and pressure may be indicated thereon.

The above, and further objects and advantages of my invention, as will hereinafter more fully appear, I attain by the construction, process, and composition of matter, described in the specification, and illustrated on the drawing, forming a part of my application.

Reference is had to the accompanying drawing, in which similar reference characters denote similar parts. In the drawing, Fig. 1 is a perspective view of a book or pad illustrating how my invention may be marketed in convenient form, Fig. 2 is an enlarged elevational view of one of the leaves of said book, having thereon the indicating means, indicia, or symbols with which my novel composition of matter is adapted to be associated, Fig. 3 is a similar view of one of the cards, showing an indicating means whereby both pressures and temperatures may be simultaneously indicated, Fig. 4 is a similar view, illustrating how varying temperature and pressures may be indicated, Fig. 5 is a similar view of a modified form of indicating means of the embossed letter or symbol type, and Fig. 6 is a cross-sectional view, taken on the line 6—6, Fig. 5.

Describing my invention more in detail, said invention may be placed on the market in any preferred way, and may be in the form of a book or pad 2, provided with leaves 4, perforated as at 6, whereby said leaves may be easily removed, and said leaves may each be additionally perforated, both longitudinally as at 8, and transversely as at 10, so the individual cards 12 may be removed therefrom as needed. Of course, any other way of marketing the devices or articles, as in practice suggested, may be used, and still remain within the province of my invention.

The individual cards 12, which may be constructed of any preferred absorbent material, so as to conveniently absorb my novel form of composition of matter, may either be placed individually on the article or articles to be sterilized in the auto clave or elsewhere, or they may be suspended in the sterilizing chamber in any suitable way, as by means of the perforations 14.

Any preferred form of indicating means may be used, or may comprise an embossed, impressed, stamped or otherwise constructed symbol, indicia or the like, 16, which may take the form of a dial as in Figs. 2-4, on which may be indicated the temperature numerals, pressure numerals, or both, so said temperatures and pressures may be indicated individually or simultaneously, any desired form of indicator, such as the arrows 18, which are treated with my novel composition of matter, hereinafter more particularly described, being used to indicate any predetermined temperature, pressure or both, when the card is subjected to heat. In Figs. 3 and 4 the upper numerals indicate the pressures, while the lower ones the temperature in degrees Fahrenheit, which, however, may be of the centigrade scale, if preferred.

As seen in Fig. 4, I have shown an additional arrow 18′, which may be treated with a varying composition of matter, sensitive to different degrees of heat, and in Fig. 5 I have shown a still further modified form of indicating means 18″, together with a symbol 20″, and a set of spaces 22″, which may also be treated with varying compositions of matter, so that varying degrees of temperature and pressure may be indicated, and permanently recorded.

The indicating means, depending upon the composition used, may be changed, when subjected to heat, from a creamy white to dark, brown or black, as the case may be, when the proper temperature and pressure, or both, have been reached.

The arrows 18 and 18′ on Figs. 3 and 4 are preferably permanently positioned on the cards 4, and may be printed or embossed thereon, and are treated, as hereinafter more particularly explained, so said arrows will react to the temperature and pressure of superheated steam to which the cards are subjected, the arrows pointing to the degree and pounds respectively of said temperature and pressure, as indicated on said cards, that is, the point at which said arrows change color.

Bacteria have a thermal death ratio, and the changing of color is so harmonized with said ratio, that when the required degree of temperature and pounds of pressure has been reached, as indicated by said changing of color, absolute assurance is had that said bacteria are killed, that is, as shown more particularly on Fig. 3, the temperature and pressure conditions to kill the bacteria have been maintained for 15 minutes.

These conditions, of course, may be varied, so long as a margin of safety is allowed, to insure that the bacteria be killed. If the card is subjected to higher temperature and pressure than that to which the arrow 18 points, said arrow simply changes color in less time, that is to say in less than 15 minutes. For example, 5 lbs. steam pressure at 228° F. for 45 minutes, 10 lbs. at 240° F. for 25 minutes and 15 lbs. of steam pressure at 250° F. for 10 minutes.

The object, more particularly, is to check the superheated steam, the temperature being always constant for any given pressure, and the scale is so arranged on the cards. The pressure variations, in themselves, however, would have no effect on the reaction which changes the color of the arrow.

Any suitable or preferred way of treating the cards may in practice be used. This may be done by printing, stamping or impressing the cards in any desired manner. For this purpose said cards or articles are preferably constructed of absorbent material such as will readily and easily absorb my novel form of composition matter.

Said composition of matter may be varied in practice to suit conditions in manufacture and marketing, and consists of a heat sensitive material such as sulfur, used in the proportions of ½ to 5, with which is mixed a color changing material, such as a lead compound, which, upon being subjected to heat, unites chemically with said sulfur, said lead compound being used in proportions varying from seven parts to 12. To these are added a suitable starchy paste, which may be a flour paste, one of the usual known pastes now on the market, or any other, to act as a suspensoid to provide for a uniform suspensive of the sulfur and the lead compound or compounds. Such pastes may be used in the proportion of one part to six. A suitable amount of distilled water is added to provide the proper fluent conditions needed, especially when the compound is to be used as ordinary printer's ink.

If desired, a suitable amount of glycerine may be added, which functions as a catalytic agent, so that the heat sensitive reaction may be varied, and further, due to the oily properties of said glycerine, the compound may be made more fluent, especially when used as printer's ink.

To the above named ingredients a sugar solution may be added, such as dextrose, levulose and the like, which serve as a catalyzer to make the heat reaction take place at still different temperatures. A 50% sugar solution may be used. A suitable drier, such as turpentine, and a vegetable or mineral oil may also be added to the mixture, in needed amounts, to treat the composition so that it will suit practical conditions, and adhere properly to the absorbent material used. And while the composition may be applied by an ordinary printing press, it will be obvious that any other way may be used, and still remain within the province of my invention.

In accordance with the provisions of the patent statutes, I have described the construction, process and composition of matter, together with the means for carrying the same into effect which I now consider to represent the best embodiment thereof; but I desire to have it understood that the means shown is only illustrative, and that the invention can be carried out by other ways.

I claim as my invention:

1. In a device of the class described, a card constructed of absorbent material and provided with embossed indicating means, and heat sensitive means associated with said embossed indicating means, whereby, when said card is subjected to certain temperature, said heat sensitive means will coact with said embossed indicating means to indicate said temperatures.

2. In a device of the class described, a card, temperature and pressure indicating means on said card, which means comprises a pre-chemically treated symbol, responsive to predetermined temperature and pressures, which means, when subjected to said temperatures and pressures will cause said symbol to permanently change color and thus clearly and distinctly indicate that said temperatures and pressures have been reached.

3. An article of manufacture comprising a card having pressure and temperature indicating means printed thereon in a substance sensitive to predetermined pressures and temperatures, said indicating means being adapted to permanently change color when said card is subjected to said predetermined pressures and temperatures.

4. An article of manufacture comprising a card having pressure and temperature indicating means printed thereon in a substance sensitive to exposure to a predetermined pressure and temperature for a predetermined length of time, said indicating means being adapted to permanently indicate said pressure and temperature when subjected thereto for said predetermined length of time.

5. An article of manufacture comprising a card having pressure and temperature indicating means thereon adapted to permanently indicate that a predetermined pressure and temperature have been attained when said card is subjected to said pressure and temperature for a predetermined length of time.

6. An article of manufacture comprising an indicator card for use in the sterilization of objects, having a heat sensitive element thereon adapted to permanently change color to indicate the sterilization of said objects when said card and said objects are subjected together to a predetermined temperature and pressure for a sufficient period of time.

In testimony whereof I have signed my name to this specification.

WILBURN F. BERNSTEIN.

DISCLAIMER 1,894,015.—*Wilburn F. Bernstein*, Los Angeles, Calif. SEPTIC INDICATOR. Patent dated January 10, 1933. Disclaimer filed June 8, 1937, by the assignee, *Aseptic-Thermo-Indicator Company*.

Hereby enters this disclaimer to claim 1 in said Letters Patent.

[*Official Gazette June 29, 1937.*]